(12) United States Patent
Wofford

(10) Patent No.: US 8,456,312 B2
(45) Date of Patent: Jun. 4, 2013

(54) DOMESTIC WATER LEAK AND HUMIDITY DETECTION AND CONTROL APPARATUS WITH WATER VALVE CONTROL

(76) Inventor: Edward C. Wofford, Nampa, ID (US)

( * ) Notice: Subject to any disclaimer, the term of this patent is extended or adjusted under 35 U.S.C. 154(b) by 432 days.

(21) Appl. No.: 12/860,923

(22) Filed: Aug. 22, 2010

(65) Prior Publication Data

US 2010/0315245 A1    Dec. 16, 2010

Related U.S. Application Data

(63) Continuation-in-part of application No. 10/254,043, filed on Feb. 10, 2003, now abandoned.

(51) Int. Cl.
*G08B 21/00* (2006.01)

(52) U.S. Cl.
USPC .......................... 340/605; 200/61.05; 137/551

(58) Field of Classification Search
USPC ... 340/604, 605, 540; 73/40.5, 40; 200/61.04, 200/61.05; 137/551
See application file for complete search history.

(56) References Cited

U.S. PATENT DOCUMENTS

| | | | |
|---|---|---|---|
| 5,229,750 A * | 7/1993 | Welch et al. | 340/605 |
| 6,526,807 B1 * | 3/2003 | Doumit et al. | 73/40.5 R |

* cited by examiner

*Primary Examiner* — Jeffery Hofsass
(74) *Attorney, Agent, or Firm* — Charles R. Clark

(57) ABSTRACT

A domestic water leak and humidity detection and control apparatus to monitor and detect water leaks and to alert a user by an aural buzzer and by illuminated green, red, or yellow LEDs of an operative state of the apparatus incorporates one or more sensor sets, each sensor set having one or more leak detectors connected to a central controller; the central controller having for each sensor set a respective comparator set and a respective LED set, and the central controller connected to and controlling the aural buzzer and controlling a water valve to control water leaks originating from a domestic water supply by electrically controlling the water valve.

3 Claims, 9 Drawing Sheets

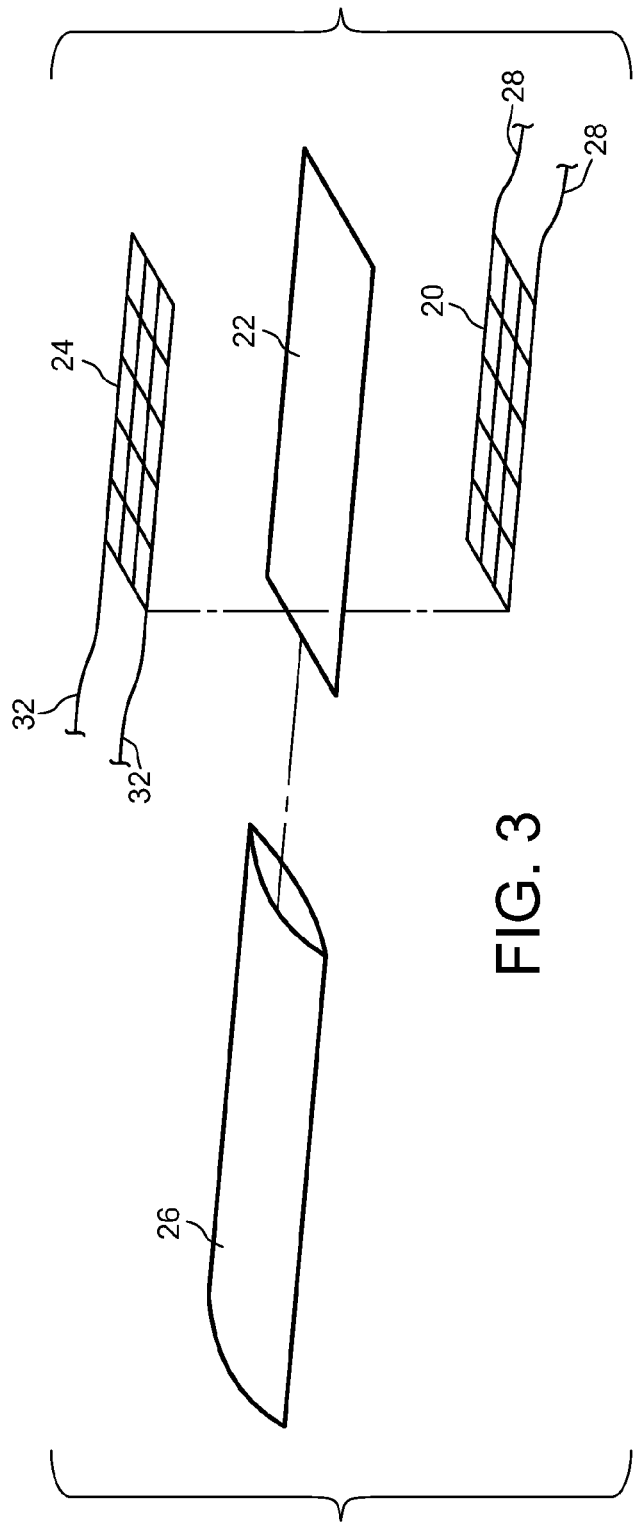
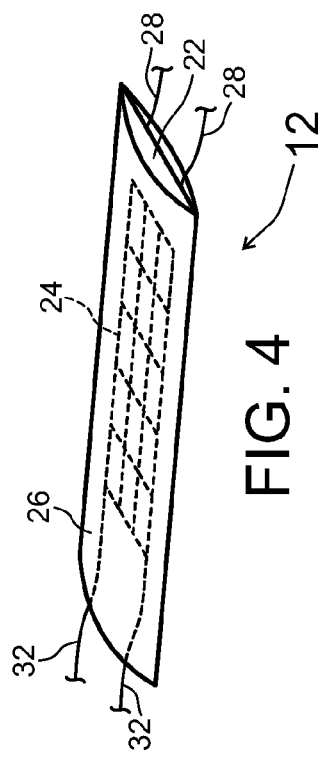

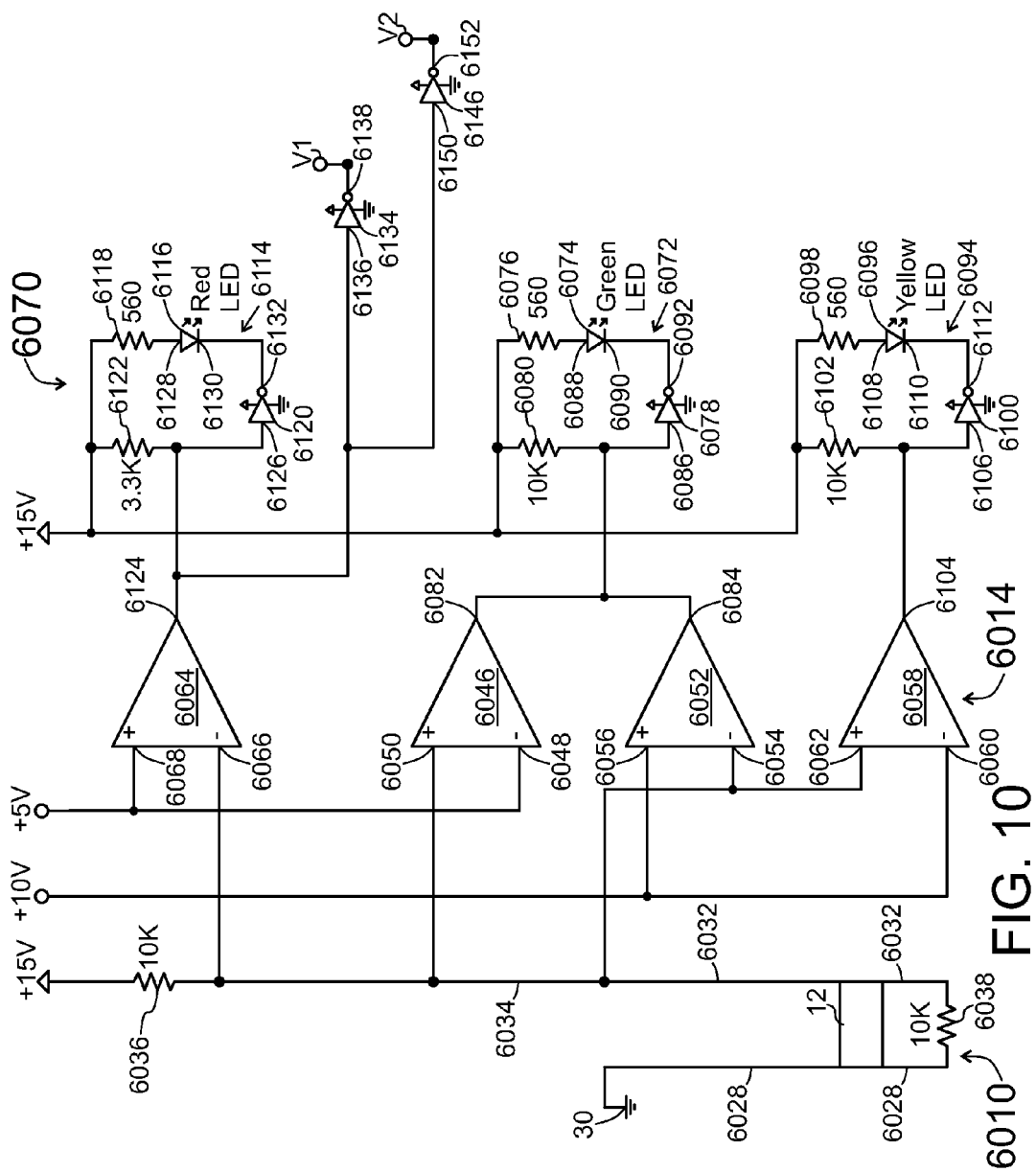

DOMESTIC WATER LEAK AND HUMIDITY DETECTION AND CONTROL APPARATUS WITH WATER VALVE CONTROL

CROSS-REFERENCE TO RELATED APPLICATIONS

This application is a continuation-in-part of application Ser. No. 10/254,043, filed Feb. 10, 2003, now abandoned, entitled DOMESTIC WATER LEAK AUTOMATIC DETECTION AND CONTROL.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

In modern society, efforts are ongoing to prevent or lessen environmental impacts to homes resulting from unwanted water leaks or excess humidity in a respective home from outside sources or from a leaking domestic water supply system in the home.

The present invention relates to a novel domestic water leak and humidity detection and control apparatus 8 having at least a first sensor set 10 having at least one leak detector 12 connected to a central controller; the central controller having at least a first comparator set 14 associated with a first LED set 70 and the first comparator set having a cumulating aural buzzer contact V1 and having a cumulating water valve contact V2. In operation, either a high voltage state or a low voltage state exists at said buzzer contact V1 and either a high voltage state or a low voltage state exists at said water valve contact V2; the respective voltage states control an aural buzzer 136 and control a water valve 184.

BRIEF SUMMARY OF THE INVENTION

A principal objective of the present invention is making available to users a domestic water leak and humidity detection and control apparatus that is robust, durable, and easy to use; is inexpensive to manufacture; and is easy to emplace in a home or other structure or location to monitor and detect unwanted water leaks and to alert the user by an aural buzzer and by illuminated green, red, or yellow LEDs of the operative state of the apparatus and to control water leaks originating from a domestic water supply by electrically controlling a water valve emplaced in the domestic water supply.

Additional objectives of the present invention are to provide a robust apparatus that will monitor specific selective locations for water leaks, humidity, or water presence and to provide an apparatus that does not require any field adjustments by an installer of the apparatus or by a home owner or other user of the apparatus and that is more convenient and easier to use than prior art domestic water leak detection systems.

The invention is a novel domestic water leak and humidity detection and control apparatus 8 having at least a first sensor set 10 having at least one leak detector 12 connected to a central controller; the central controller having at least a first comparator set 14 and at least a first LED set 70; the apparatus powered by a power supply; and the central controller connected to and controlling an aural buzzer 136 and a water valve 184.

One or more leak detectors 12 form a sensor set and in the best embodiment of the invention, as shown in FIGS. 1 and 2, there are six sensor sets 10, 2010, 3010, 4010, 5010, and 6010 connected to a central controller and the central controller controls the aural buzzer and the water valve. In the central controller, each sensor set is connected to a respective comparator set and each such comparator set is connected to a respective LED set. Each comparator set controls an associated LED set and the cumulative output of the comparator sets in the central controller controls an aural buzzer and also controls an electrical water valve.

In the best embodiment, the central controller is a printed circuit board having components connected by traces.

Leak detectors 12 can be placed at selected locations throughout a home or other structure or location to enable the apparatus to monitor for the presence of unwanted water or water leaks.

In the best embodiment of the invention in a home, one or more leak detectors would be distributed throughout the home and placed in each location that a user considered at risk of suffering from a water leak or unwanted water such as in close proximity: to appliances that interact with water (water heaters, dishwashers, washing machines, and ice makers), to sinks, to bathtubs, to showers, to toilets, to faucets, to bidets, and to other selected locations such as attics, crawl spaces, garages, or basements or other selected areas of the home.

Another objective of the present invention is to provide a leak detector 12 that after having detected a leak and being wet can be easily reconditioned and restored to an operative dry condition.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 3 is a perspective exploded view of a preferred leak detector 12;

FIG. 4 is a perspective assembled view of the leak detector 12 shown in FIG. 3;

FIG. 10 is a schematic circuit diagram of a sixth sensor set 6010 operatively connected to a sixth comparator set 6014, the sixth comparator set having a first comparator 6046, a second comparator 6052, a third comparator 6058, and a fourth comparator 6064 and the sixth comparator set operatively connected to a sixth LED set 6070, the sixth LED set having a green LED circuit 6072, a yellow LED circuit 6094, and a red LED circuit 6114; and showing the cumulating aural buzzer contact V1 and the cumulating water valve contact V2.

DETAILED DESCRIPTION OF THE INVENTION

Figure 1:
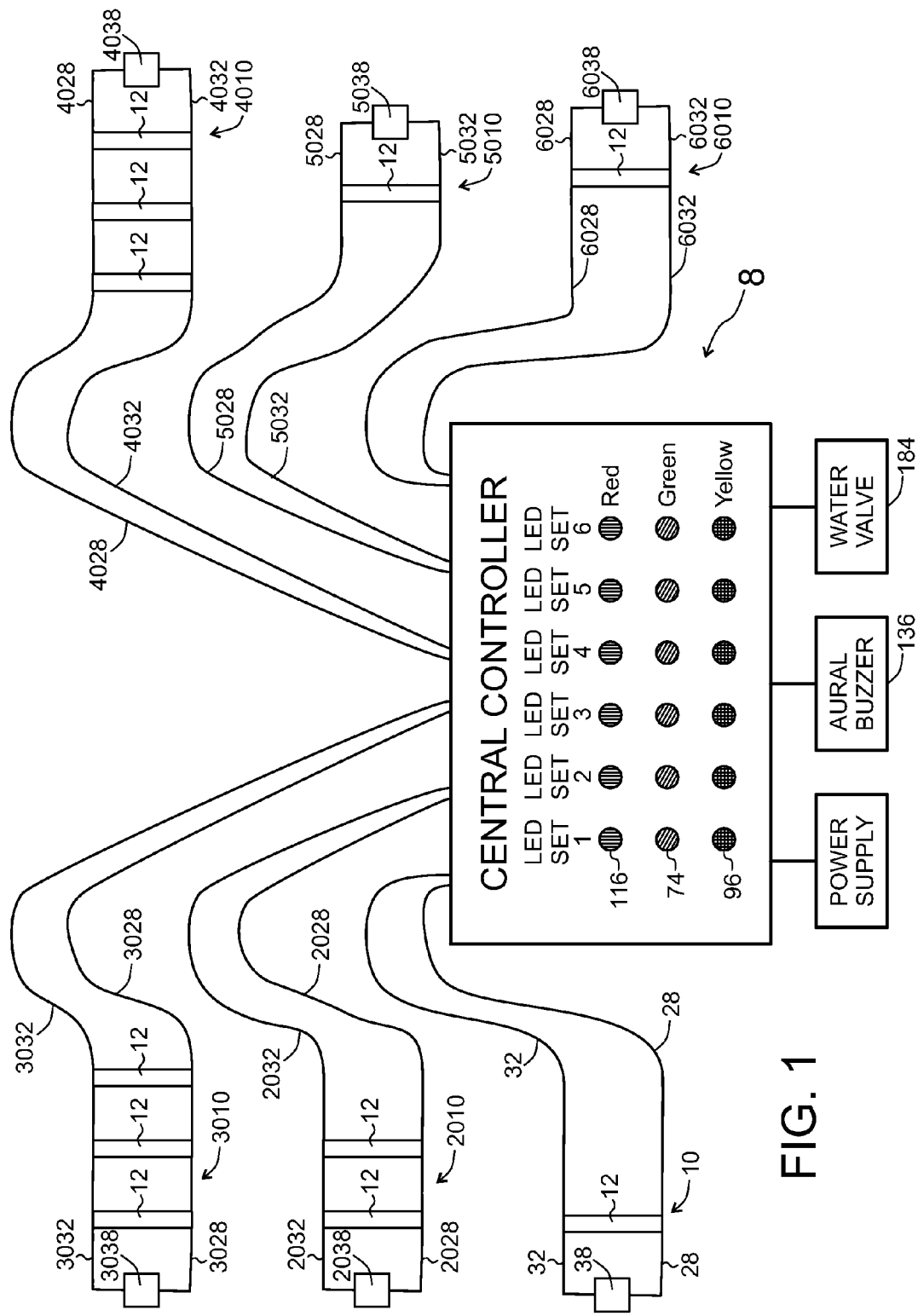
FIG. 1 is an overall block diagram of a domestic water leak and humidity detection and control apparatus 8.
Figure 2:
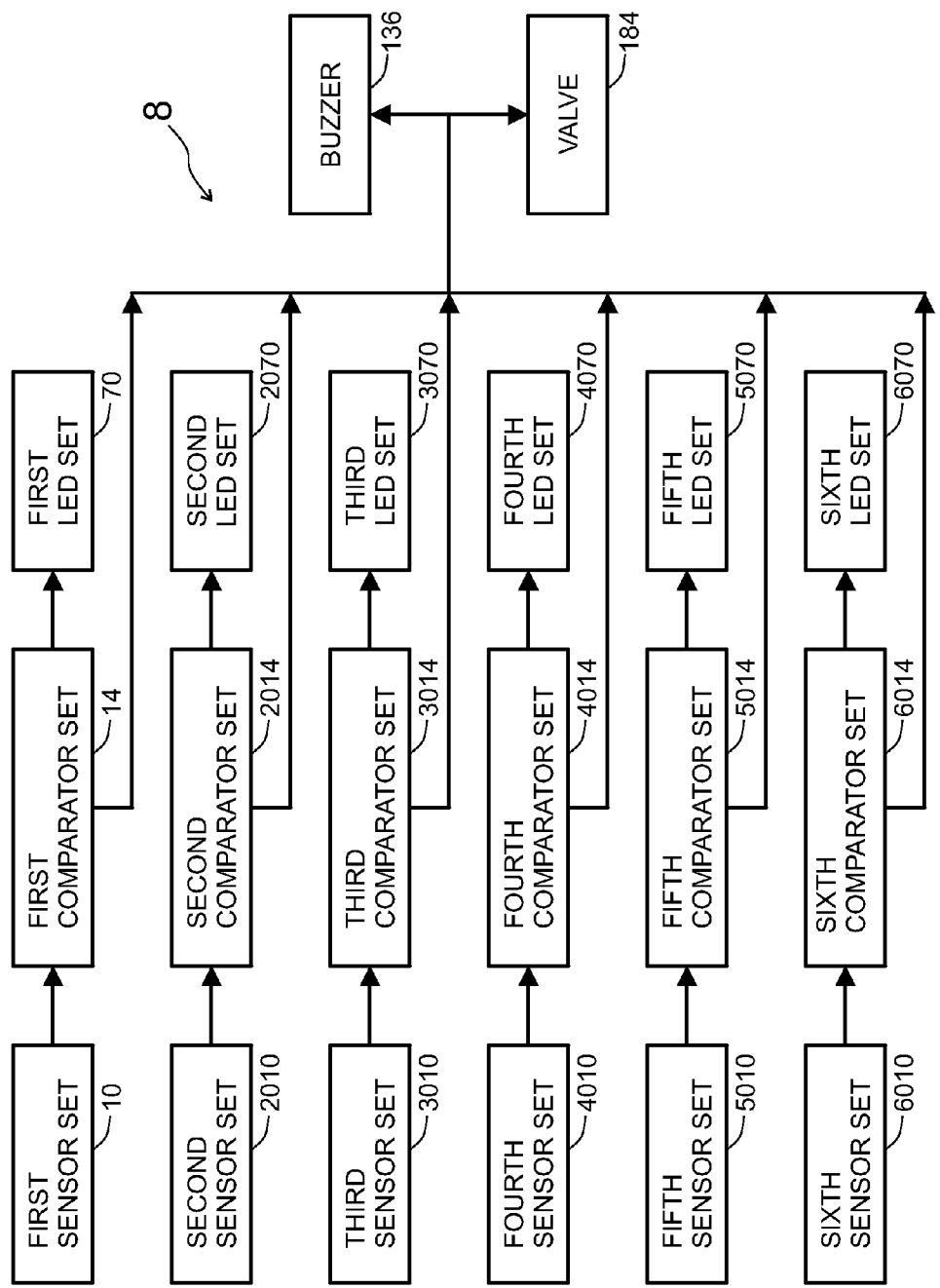
FIG. 2 is a simplified block diagram of the domestic water leak and humidity detection and control apparatus 8 shown in FIG. 1.

FIGS. 1, 2, 5 to 9, show the preferred embodiment of the water leak detection and control apparatus 8. The preferred embodiment has six sensor sets, each sensor set operatively associated with a respective comparator set, each comparator set operatively associated with a respective LED set and the voltage state at the cumulating aural buzzer V1 controlling the aural buzzer 136 and the voltage state at the cumulating water valve contact V2 controlling the water valve.

As shown in FIGS. 3 and 4, preferably, each leak detector 12 comprises a first conductive metal grid 20 overlaid by a porous insulating layer 22 that previously was impregnated with a sodium chloride solution or another salt solution and dried and the insulating layer overlaid by a second conductive metal grid 24; the grids and the insulating layer are sandwiched within a porous sleeve 26. Preferably, the porous insulating layer 22 and the porous sleeve 26 are fabricated from porous felt or other suitable fabric or material.

For each leak detector 12 in each sensor set 10, 2010, 3010, 4010, 5010, 6010, the respective first conductive metal grid 20 is connected to a respective first wire 28, 2028, 3028, 4028, 5028, 6028 and the first wire at one end is connected to a ground trace 30 of the central controller and the respective second conductive metal grid 24 is connected to a respective second wire 32, 2032, 3032, 4032, 5032, 6032 and the second wire is connected at one end to a respective signal voltage trace 34, 2034, 3034, 4034, 5034, 6034 of the central controller; a respective terminating resistor 38, 2038, 3038, 4038, 5038, 6038 connects the other end of the first wire to the other end of the second wire; the respective signal voltage trace is connected in series to a respective signal voltage resistor 36, 2036, 3036, 4036, 5036, 6036 and the signal voltage resistor is connected in series to a 15v source voltage of the central controller; and the terminating resistor has the same resistance as the signal voltage resistor.

Figure 5:
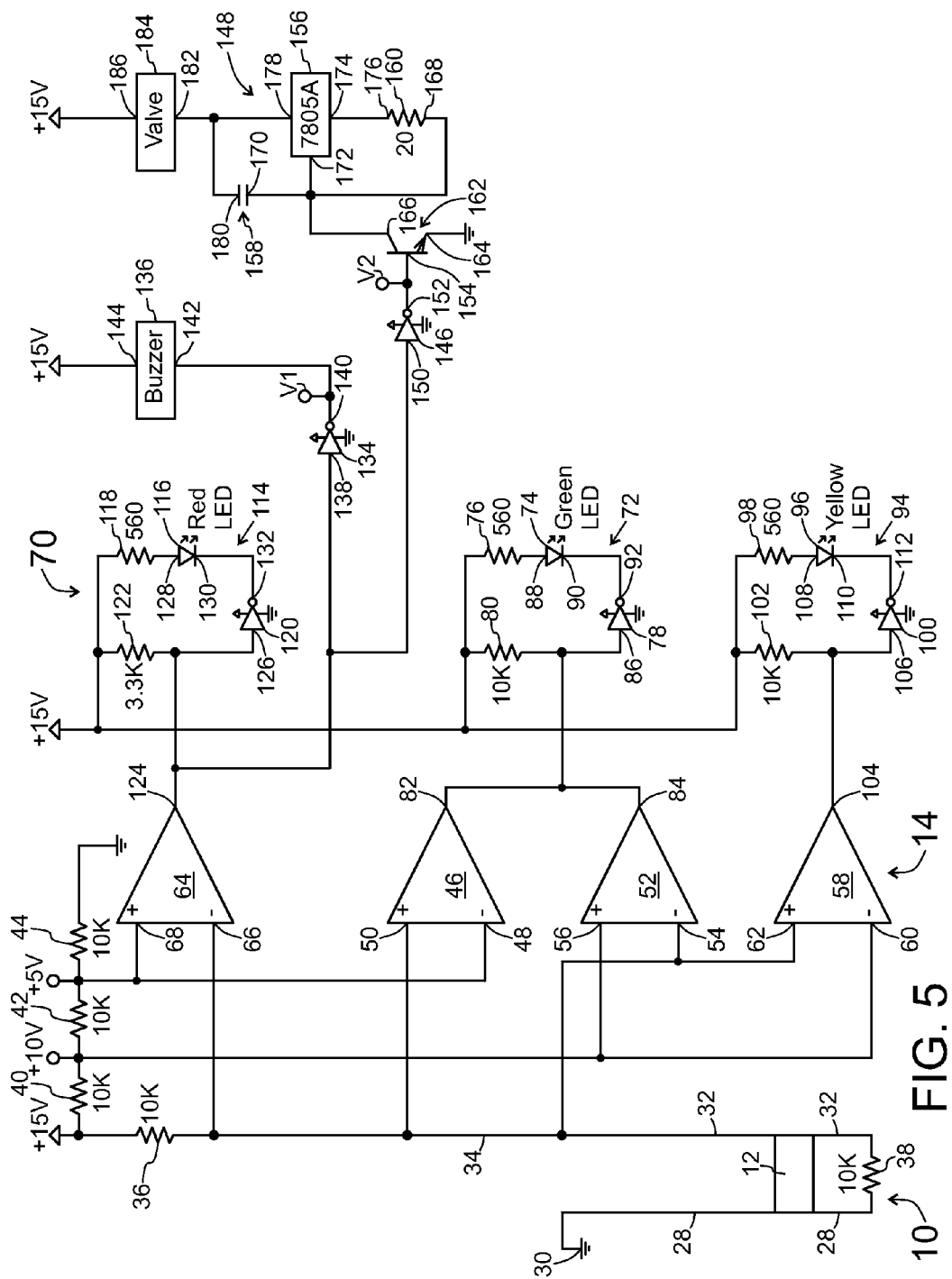
FIG. 5 is a schematic circuit diagram of a first embodiment of the domestic water leak and humidity detection and control apparatus 8 shown in FIG. 1 having at least a first sensor set 10 operatively connected to a first comparator set 14, the first comparator set having a first comparator 46, a second comparator 52, a third comparator 58, and a fourth comparator 64 and the first comparator set operatively connected to a first LED set 70, the first LED set having a green LED circuit 72, a yellow LED circuit 94, and a red LED circuit 114; and showing a fourth comparator output 124 of the fourth comparator controlling an aural buzzer 136 and a water valve 184 and showing a cumulating aural buzzer contact V1 and a cumulating water valve contact V2.
Figure 6:
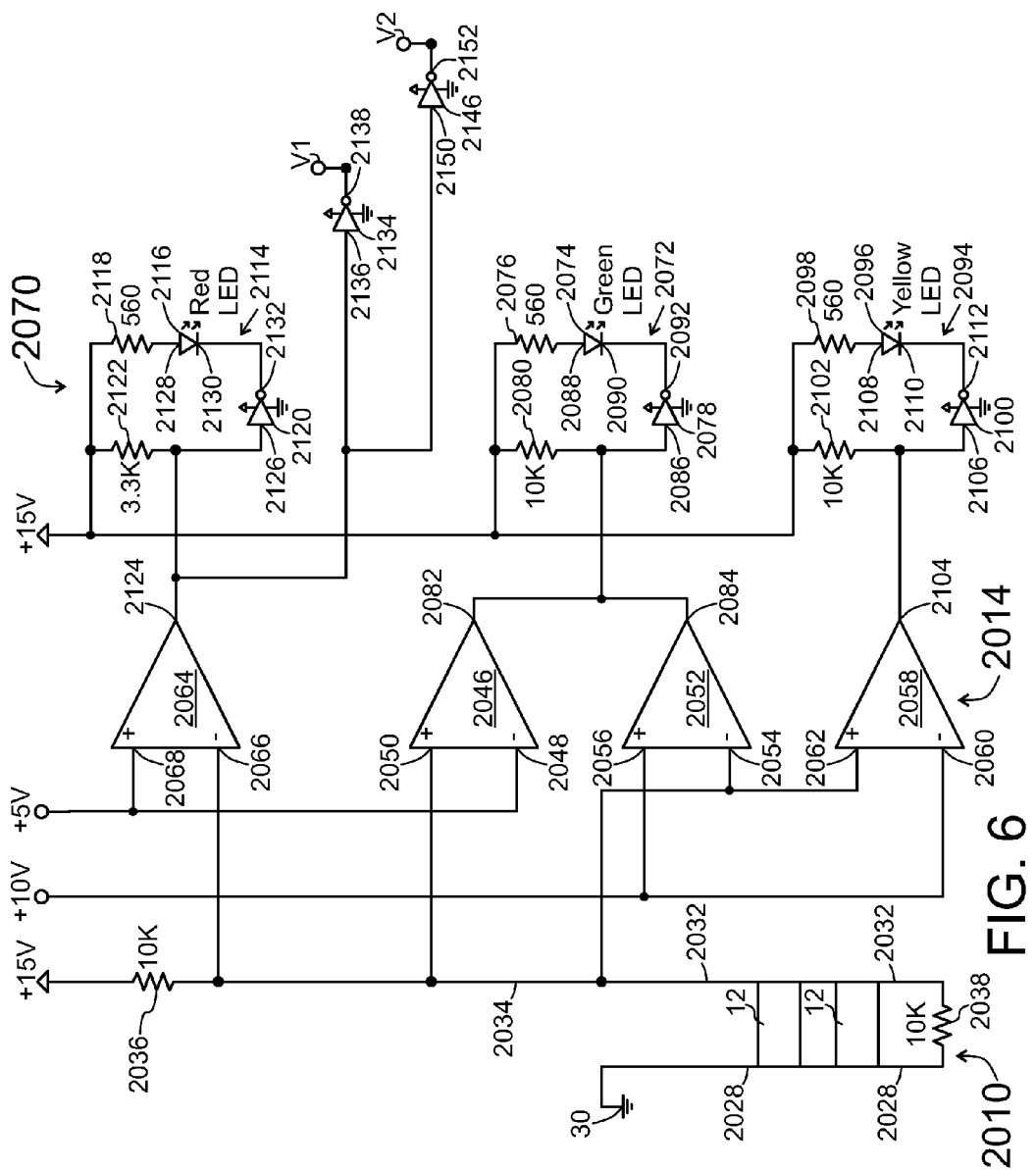
FIG. 6 is a schematic circuit diagram of a second sensor set 2010 operatively connected to a second comparator set 2014, the second comparator set having a first comparator 2046, a second comparator 2052, a third comparator 2058, and a fourth comparator 2064 and the second comparator set operatively connected to a second LED set 2070, the second LED set having a green LED circuit 2072, a yellow LED circuit 2094, and a red LED circuit 2114; and showing the cumulating aural buzzer contact V1 and the cumulating water valve contact V2.
Figure 7:
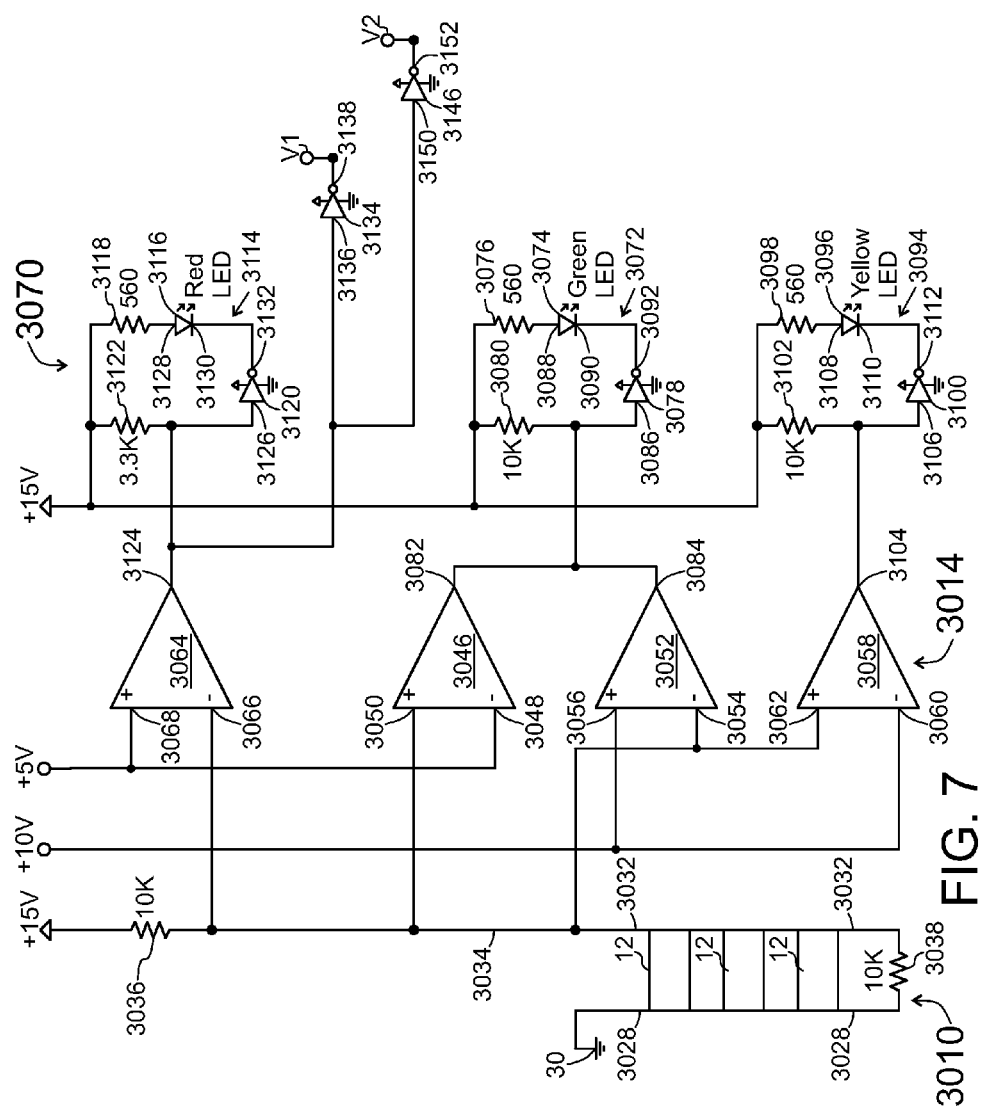
FIG. 7 is a schematic circuit diagram of a third sensor set 3010 operatively connected to a third comparator set 3014, the third comparator set having a first comparator 3046, a second comparator 3052, a third comparator 3058, and a fourth comparator 3064 and the third comparator set operatively connected to a third LED set 3070, the third LED set having a green LED circuit 3072, a yellow LED circuit 3094, and a red LED circuit 3114; and showing the cumulating aural buzzer contact V1 and the cumulating water valve contact V2.
Figure 8:
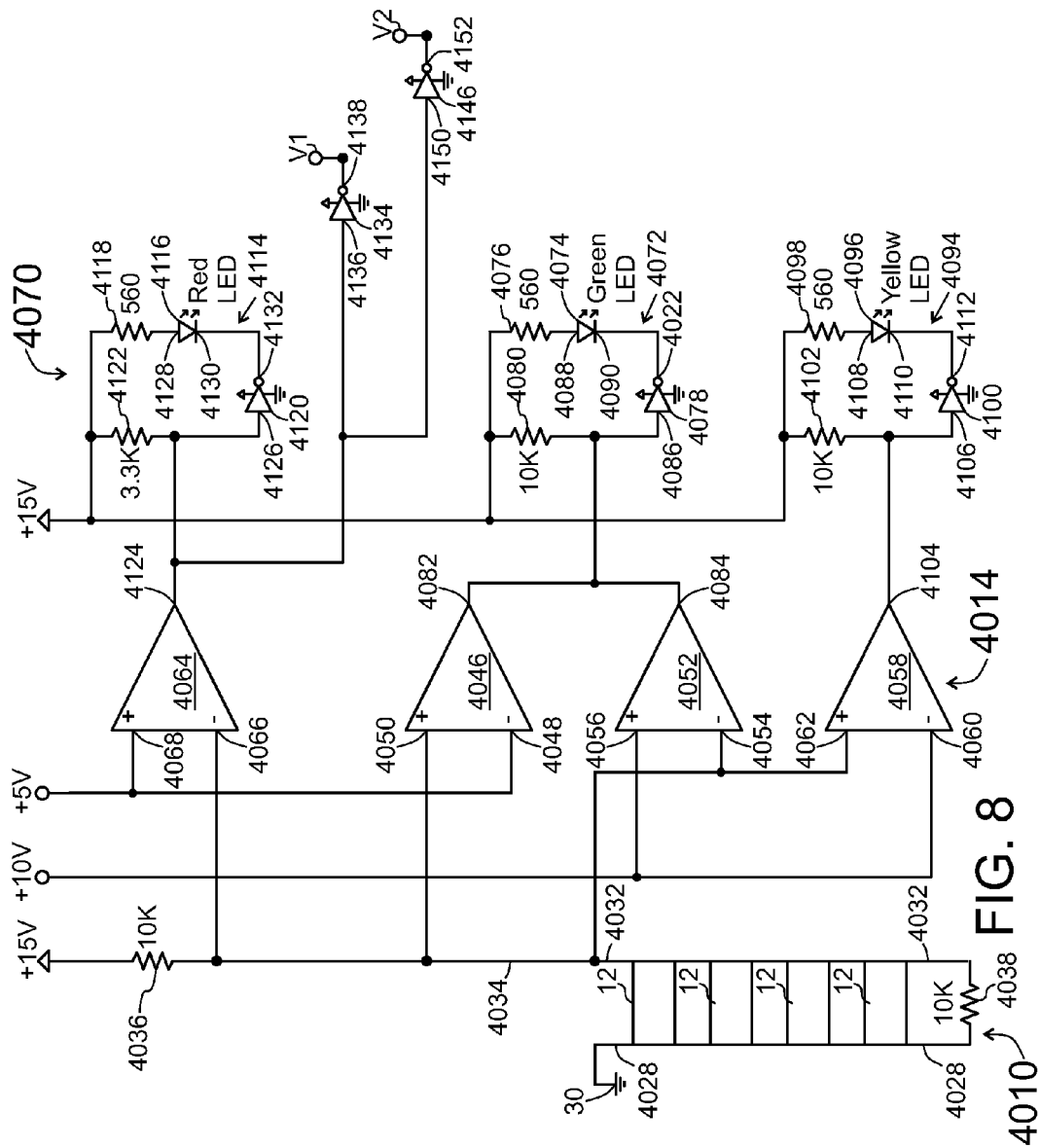
FIG. 8 is a schematic circuit diagram of a fourth sensor set 4010 operatively connected to a fourth comparator set 4014, the fourth comparator set having a first comparator 4046, a second comparator 4052, a third comparator 4058, and a fourth comparator 4064 and the fourth comparator set operatively connected to a fourth LED set 4070, the fourth LED set having a green LED circuit 4072, a yellow LED circuit 4094, and a red LED circuit 4114; and showing the cumulating aural buzzer contact V1 and the cumulating water valve contact V2.

As shown in FIG. 5, the central controller has a 15v source voltage and has two reference voltages of 10v and 5v in the best embodiment generated by a set of three voltage divider resistors 40, 42, and 44; each voltage divider resistor having the same resistance connected in series between the 15v source voltage and ground.

In each comparator set 14, 2014, 3014, 4014, 5014, 6014, a respective first comparator 46, 2046, 3046, 4046, 5046, 6046 has a first comparator negative input pin 48, 2048, 3048, 4048, 5048, 6048 which is connected to the 5v reference voltage and a first comparator positive input pin 50, 2050, 3050, 4050, 5050, 6050 which is connected to the respective signal voltage trace 34, 2034, 3034, 4034, 5034, 6034 associated with the respective sensor set.

In each comparator set 14, 2014, 3014, 4014, 5014, 6014, a respective second comparator 52, 2052, 3052, 4052, 5052, 6052 has a second comparator negative input pin 54, 2054, 3054, 4054, 5054, 6054 which is connected to the respective signal voltage trace 34, 2034, 3034, 4034, 5034, 6034 associated with the respective sensor set and a second comparator positive input pin 56, 2056, 3056, 4056, 5056, 6056 which is connected to the 10v reference voltage.

In each comparator set 14, 2014, 3014, 4014, 5014, 6014, a respective third comparator 58, 2058, 3058, 4058, 5058, 6058 has a third comparator negative input pin 60, 2060, 3060, 4060, 5060, 6060 which is connected to the 10v reference voltage and a third comparator positive input pin 62, 2062, 3062, 4062, 5062, 6062 which is connected to the respective signal voltage trace 34, 2034, 3034, 4034, 5034, 6034 associated with the respective sensor set.

In each comparator set 14, 2014, 3014, 4014, 5014, 6014, a respective fourth comparator 64, 2064, 3064, 4064, 5064, 6064 has a fourth comparator negative input pin 66, 2066, 3066, 4066, 5066, 6066 which is connected to the respective signal voltage trace 34, 2034, 3034, 4034, 5034, 6034 associated with the respective sensor set and a fourth comparator positive input pin 68, 2068, 3068, 4068, 5068, 6068 which is connected to the 5v reference voltage.

Each LED set 70, 2070, 3070, 4070, 5070, 6070 has respectively a green LED, a yellow LED, and a red LED; and each LED is controlled by a respective LED circuit.

In each respective LED set 70, 2070, 3070, 4070, 5070, 6070, a green LED circuit 72, 2072, 3072, 4072, 5072, 6072 has a green LED 74, 2074, 3074, 4074, 5074, 6074 with an associated green LED current limiting resistor 76, 2076, 3076, 4076, 5076, 6076; a green LED inverting driver 78, 2078, 3078, 4078, 5078, 6078; a green LED pull-up resistor 80, 2080, 3080, 4080, 5080, 6080 connected from the 15v source voltage to a first comparator output pin 82, 2082, 3082, 4082, 5082, 6082 of the associated first comparator and to a second comparator output pin 84, 2084, 3084, 4084, 5084, 6084 of the associated second comparator and a green LED inverting driver input pin 86, 2086, 3086, 4086, 5086, 6086 of the green LED inverting driver; the green LED current limiting resistor is connected from the 15v source voltage to a green LED positive terminal 88, 2088, 3088, 4088, 5088, 6088 of the green LED; and a green LED negative terminal 90, 2090, 3090, 4090, 5090, 6090 of the green LED is connected to a green LED inverting driver output pin 92, 2092, 3092, 4092, 5092, 6092 of the green LED inverting driver.

In each respective LED set 70, 2070, 3070, 4070, 5070, 6070, a yellow LED circuit 94, 2094, 3094, 4094, 5094, 6094 has: a yellow LED 96, 2096, 3096, 4096, 5096, 6096 with an associated yellow LED current limiting resistor 98, 2098, 3098, 4098, 5098, 6098; a yellow LED inverting driver 100, 2100, 3100, 4100, 5100, 6100; a yellow LED pull-up resistor 102, 2102, 3102, 4102, 5102, 6102 connected from a 15v source to a third comparator output pin 104, 2104, 3104, 4104, 5104, 6104 of the associated third comparator and to a yellow LED inverting driver input pin 106, 2106, 3106, 4106, 5106, 6106 of the yellow LED inverting driver; the yellow LED current limiting resistor is connected from a 15v source voltage to a yellow LED positive terminal 108, 2108, 3108, 4108, 5108, 6108 of the yellow LED; and a yellow LED negative terminal 110, 2110, 3110, 4110, 5110, 6110 of the yellow LED is connected to a yellow LED inverting driver output pin 112, 2112, 3112, 4112, 5112, 6112 of the yellow LED inverting driver.

In each respective LED set 70, 2070, 3070, 4070, 5070, 6070, a red LED circuit 114, 2114, 3114, 4114, 5114, 6114 has a red LED 116, 2116, 3116, 4116, 5116, 6116 with an associated red LED current limiting resistor 118, 2118, 3118, 4118, 5118, 6118; a red LED inverting driver 120, 2120, 3120, 4120, 5120, 6120; a red LED pull-up resistor 122, 2122, 3122, 4122, 5122, 6122 connected from a 15v source voltage to a fourth comparator output pin 124, 2124, 3124, 4124, 5124, 6124 of the associated fourth comparator and to a red LED inverting driver input pin 126, 2126, 3126, 4126, 5126, 6126 of the red LED inverting driver; the red LED current limiting resistor is connected from a 15v source to a red LED positive terminal 128, 2128, 3128, 4128, 5128, 6128 of the red LED; and a red LED negative terminal 130, 2130, 3130, 4130, 5130, 6130 of the red LED is connected to a red LED inverting driver output pin 132, 2132, 3132, 4132, 5132, 6132 of the red LED inverting driver.

With respect to each fourth comparator 64, 2064, 3064, 4064, 5064, 6064 of each comparator set, a buzzer control circuit comprises a respective buzzer inverting driver 134, 2134, 3134, 4134, 5134, 6134 having a buzzer inverting driver input pin 138, 2138, 3138, 4138, 5138, 6138 connected to the fourth comparator output pin 124, 2124, 3124, 4124, 5124, 6124 of the respective fourth comparator and the respective buzzer inverting driver having a buzzer inverting driver output pin 140, 2140, 3140, 4140, 5140, 6140 connected through a cumulating aural buzzer contact V1 to a negative terminal 142 of an aural buzzer 136; and a positive terminal 144 of the aural buzzer connected to the 15v source voltage. For each respective buzzer control circuit in the central controller, the output pin of the respective associated buzzer inverting driver is connected to the buzzer 136 through the cumulating aural buzzer contact V1.

With respect to each fourth comparator 64, 2064, 3064, 4064, 5064, 6064 of each comparator set, a respective water valve inverting driver 146, 2146, 3146, 4146, 5146, 6146 participates in controlling a water valve controlling circuit 148. A respective water valve inverting driver input pin 150, 2150, 3150, 4150, 5150, 6150 is connected to the fourth comparator output pin 124, 2124, 3124, 4124, 5124, 6124 of the respective fourth comparator and a respective water valve inverting driver output pin 152, 2152, 3152, 4152, 5152, 6152 is connected through a cumulating water valve circuit contact V2 to a base 154 of a NPN transistor 162 of a water valve controlling circuit. For each respective water valve inverting driver in the central controller, the respective water valve inverting driver output pin is connected to the water valve controlling circuit through the cumulating water valve circuit contact V2.

The water valve controlling circuit 148 comprises a current driver (7805A) 156, a capacitor 158, a water valve circuit resistor 160, and a transistor 162 and a base 154 of the transistor is connected to the cumulating water valve circuit contact V2 and an emitter 164 of the transistor is connected to ground, and a collector 166 of the transistor is connected to a first side 168 of the water valve circuit resistor, a first side 170 of the capacitor, and a current driver negative terminal 172 of the current driver; and the current driver has a current driver output pin 174 connected to a second side 176 of the water valve circuit resistor and the current driver has a current driver positive terminal 178 connected to a second side 180 of the capacitor and a water valve negative terminal 182 of a water valve 184, and the water valve has a water valve positive terminal 186 connected to a 15v source voltage.

Referring to FIGS. 5 to 10, a description of the operative states of the apparatus follows: first with a discussion of a normal state (leak detector dry with no water leak present); second with a discussion of an open sensor state (first wire, second wire, first conductive metal grid, or second conductive metal grid not intact); and third with a discussion of a leak detection state (leak detector wet with a water leak or excess humidity present).

When in the normal state with each leak detector 12 dry and each first wire 28, 2028, 3028, 4028, 5028, 6028, each second wire 32, 2032, 3032, 4032, 5032, 6032, each first conductive metal grid 20, and each second conductive metal grid 24 intact; the 15v source voltage is divided equally by each respective signal voltage resistor 36, 2036, 3036, 4036, 5036, 6036 and each respective terminating resistor 38, 2038, 3038, 4038, 5038, 6038 to produce a voltage of 7.5 volts at each respective signal voltage trace 34, 2034, 3034, 4034, 5034, 6034; each respective first comparator positive input pin 50, 2050, 3050, 4050, 5050, 6050 is connected to the 7.5 volts present at each respective signal voltage trace and each respective first comparator negative input pin 48, 2048, 3048, 4048, 5048, 6048 is connected to the 5v reference voltage establishing a forward bias in each respective first comparator and each respective first comparator outputs a high state voltage at each respective first comparator output pin 82, 2082, 3082, 4082, 5082, 6082; each respective second comparator positive input pin 56, 2056, 3056, 4056, 5056, 6056 is connected to the 10v reference voltage and each respective second comparator negative input pin 54, 2054, 3054, 4054, 5054, 6054 is connected to the 7.5 volts present at each respective signal voltage trace establishing a forward bias in each respective second comparator and each respective second comparator outputs a high state voltage at each respective second comparator output pin 84, 2084, 3084, 4084, 5084, 6084; each respective third comparator positive input pin 62, 2062, 3062, 4062, 5062, 6062 is connected to the 7.5 volts present at each respective signal voltage reference trace and each respective third comparator negative input pin 60, 2060, 3060, 4060, 5060, 6060 is connected to the 10v reference voltage establishing a reverse bias in each respective third comparator and each respective third comparator outputs a low state voltage at each respective third comparator output pin 104, 2104, 3104, 4104, 5104, 6104; each respective fourth comparator positive input pin 68, 2068, 3068, 4068, 5068, 6068 is connected to the 5v reference voltage and each respective fourth comparator negative input pin 66, 2066, 3066, 4066, 5066, 6066 is connected to the 7.5 volts present at each respective signal voltage trace establishing a reverse bias in each respective fourth comparator and each respective fourth comparator outputs a low state voltage at each respective fourth comparator output pin 124, 2124, 3124, 4124, 5124, 6124; each respective green LED inverting driver input pin 86, 2086, 3086, 4086, 5086, 6086 receives a high state voltage from each respective first comparator output pin 82, 2082, 3082, 4082, 5082, 6082 and each respective second comparator output pin 84, 2084, 3084, 4084, 5084, 6084 and each respective green LED inverting driver outputs a low state voltage at each respective green LED inverting driver output pin 92, 2092, 3092, 4092, 5092, 6092 allowing current to flow through each respective green LED 74, 2074, 3074, 4074, 5074, 6074 illuminating the respective green LED; each respective yellow LED inverting driver input pin 106, 2106, 3106, 4106, 5106, 6106 receives a low state voltage from each respective third comparator output pin 104, 2104, 3104, 4104, 5104, 6104 and each respective yellow LED inverting driver 100, 2100, 3100, 4100, 5100, 6100 outputs a high state voltage at each respective yellow LED inverting driver output pin 112, 2112, 3112, 4112, 5112, 6112 not allowing current to flow through each respective yellow LED 96, 2096, 3096, 4096, 5096, 6096 (each respective yellow LED does not illuminate); each respective red LED inverting driver input pin 126, 2126, 3126, 4126, 5126, 6126 receives a low state voltage from each respective fourth comparator output pin 124, 2124, 3124, 4124, 5124, 6124 and each respective red LED inverting driver 120, 2120, 3120, 4120, 5120, 6120 outputs a high state voltage at each respective red LED inverting driver output pin 132, 2132, 3132, 4132, 5132, 6132 not allowing current to flow through each respective red LED 116, 2116, 3116, 4116, 5116, 6116 (each respective red LED does not illuminate); each respective buzzer inverting driver input pin 138, 2138, 3138, 4138, 5138, 6138 receives a low state voltage from each respective fourth comparator output pin 124, 2124, 3124, 4124, 5124, 6124 and each respective buzzer inverting driver 134, 2134, 3134, 4134, 5134, 6134 outputs a high state voltage at each respective buzzer inverting driver output pin 140, 2140, 3140, 4140, 5140, 6140 (each buzzer inverting driver output pin is connected to the buzzer through the cumulating aural buzzer contact V1) not allowing current to flow through the buzzer 136 (the buzzer does not buzz); each respective water valve inverting driver input pin 150, 2150, 3150, 4150, 5150, 6150 receives a low state voltage from each respective fourth comparator output pin 124, 2124, 3124, 4124, 5124, 6124 and each respective water valve inverting driver 146, 2146, 3146, 4146, 5146, 6146 outputs a high state voltage at each respective water valve inverting driver output pin 152, 2152, 3152, 4152, 5152, 6152; and the NPN transistor base 154 receives the high state voltage from each respective water valve inverting driver output pin through the cumulating water valve circuit contact V2, and the NPN transistor 162 allows current to flow from the current driver positive terminal 178 to the current driver output pin 174 drawing current through the water valve 184 whereby the water valve is kept open to allow water to flow through the water valve.

In the water valve controlling circuit 148 and during initialization of the normal state, current is allowed to flow through the water valve 184 to develop a charge on the capacitor 158. The summed value of the capacitor charging current and the current driver current is sufficient to open the water valve 184 and after initialization the current driver current is sufficient to hold the water valve open.

The open sensor state exists in a respective sensor set 10, 2010, 3010, 4010, 5010, 6010 when a respective first wire 28, 2028, 3028, 4028, 5028, 6028, a respective second wire 32, 2032, 3032, 4032, 5032, 6032, a respective first conductive metal grid 20, or a respective second conductive metal grid 24 is not intact; in the open sensor state, the 15v source voltage is not conveyed to ground through a respective terminating resistor 38, 2038, 3038, 4038, 5038, 6038 and produces a voltage of 15 volts at the respective signal voltage trace 34, 2034, 3034, 4034, 5034, 6034; the respective first comparator positive input pin 50, 2050, 3050, 4050, 5050, 6050 is connected to the 15 volts present at the respective signal voltage trace and the respective first comparator negative input pin 48, 2048, 3048, 4048, 5048, 6048 is connected to the 5v reference voltage establishing a forward bias in the respective first comparator and the respective first comparator outputs a high state voltage at the respective first comparator output pin 82, 2082, 3082, 4082, 5082, 6082; the respective second comparator positive input pin 56, 2056, 3056, 4056, 5056, 6056 is connected to the 10v reference voltage and the respective second comparator negative input pin 54, 2054, 3054, 4054, 5054, 6054 is connected to the 15 volts present at the respective signal voltage trace establishing a reverse bias in the respective second comparator and the respective second comparator outputs a low state voltage at the respective second comparator output pin 84, 2084, 3084, 4084, 5084, 6084; the respective third comparator positive input pin 62, 2062, 3062, 4062, 5062, 6062 is connected to the 15 volts present at the respective signal voltage reference trace and the respective third comparator negative input pin 60, 2060, 3060, 4060, 5060, 6060 is connected to the 10v reference voltage establishing a forward bias in the respective third comparator and the respective third comparator outputs a high state voltage at the respective third comparator output pin 104, 2104, 3104, 4104, 5104, 6104; the respective fourth comparator positive input pin 68, 2068, 3068, 4068, 5068, 6068 is connected to the 5v reference voltage and the respective fourth comparator negative input pin 66, 2066, 3066, 4066, 5066, 6066 is connected to the 15 volts present at the respective signal voltage trace establishing a reverse bias in the respective fourth comparator and the respective fourth comparator outputs a low state voltage at the respective fourth comparator output pin 124, 2124, 3124, 4124, 5124, 6124; the respective green LED inverting driver input pin 86, 2086, 3086, 4086, 5086, 6086 receives a high state voltage from the respective first comparator output pin 82, 2082, 3082, 4082, 5082, 6082 and a low state voltage from the respective second comparator output pin 84, 2084, 3084, 4084, 5084, 6084; the low state voltage from the respective second comparator output pin pulls the high state output of the respective first comparator pin to a low state and the respective green LED inverting driver outputs a high state voltage at the respective green LED inverting driver output pin 92, 2092, 3092, 4092, 5092, 6092 not allowing current to flow through the respective green LED 74, 2074, 3074, 4074, 5074, 6074 and not illuminating the respective green LED; the respective yellow LED inverting driver input pin 106, 2106, 3106, 4106, 5106, 6106 receives a high state voltage from the respective third comparator output pin 104, 2104, 3104, 4104, 5104, 6104 and the respective yellow LED inverting driver 100, 2100, 3100, 4100, 5100, 6100 outputs a low state voltage at the respective yellow LED inverting driver output pin 112, 2112, 3112, 4112, 5112, 6112 allowing current to flow through the respective yellow LED 96, 2096, 3096, 4096, 5096, 6096 illuminating the respective yellow LED; the respective red LED inverting driver input pin 126, 2126, 3126, 4126, 5126, 6126 receives a low state voltage from the respective fourth comparator output pin 124, 2124, 3124, 4124, 5124, 6124 and the respective red LED inverting driver 120, 2120, 3120, 4120, 5120, 6120 outputs a high state voltage at the respective red LED inverting driver output pin 132, 2132, 3132, 4132, 5132, 6132 not allowing current to flow through the respective red LED 116, 2116, 3116, 4116, 5116, 6116 (the red LED does not illuminate); the respective buzzer inverting driver input pin 138, 2138, 3138, 4138, 5138, 6138 receives a low state voltage from the respective fourth comparator output pin 124, 2124, 3124, 4124, 5124, 6124 and the respective buzzer inverting driver 134, 2134, 3134, 4134, 5134, 6134 outputs a high state voltage at the respective buzzer inverting driver output pin 140, 2140, 3140, 4140, 5140, 6140 (each buzzer inverting driver output pin is connected to the buzzer through the cumulating aural buzzer contact V1) not allowing current to flow through the buzzer 136 (the buzzer does not buzz); the respective water valve inverting driver input pin 150, 2150, 3150, 4150, 5150, 6150 receives a low state voltage from the respective fourth comparator output pin 124, 2124, 3124, 4124, 5124, 6124 and the respective water valve inverting driver 146, 2146, 3146, 4146, 5146, 6146 outputs a high state voltage at the respective water valve inverting driver output pin 152, 2152, 3152, 4152, 5152, 6152; the NPN transistor base 154 receives the high state voltage from the water valve inverting driver output pin through the cumulating water valve circuit contact V2, and the NPN transistor 162 allows current to flow from the current driver positive terminal 178 to the current driver output pin 174 drawing current through the water valve 184 whereby the water valve is kept open to allow water to flow through the water valve.

The leak detection state exists in a respective sensor set 10, 2010, 3010, 4010, 5010, 6010 when one or more leak detectors 12 of the respective sensor set are wet; and a respective first wire 28, 2028, 3028, 4028, 5028, 6028, a respective second wire 32, 2032, 3032, 4032, 5032, 6032, a respective first conductive metal grid 20, and a respective second conductive metal grid 24 are intact; in the leak detection state, the respective signal voltage trace 34, 2034, 3034, 4034, 5034, 6034 is connected to the ground trace 30 through the respective conducting wet leak detector to produce a voltage of less than five volts at the signal voltage trace; the respective first comparator positive input pin 50, 2050, 3050, 4050, 5050, 6050 is connected to the less than five volts present at the respective signal voltage trace and the respective first comparator negative input pin 48, 2048, 3048, 4048, 5048, 6048 is connected to the 5v reference voltage establishing a reverse bias in the respective first comparator and the respective first comparator outputs a low state voltage at the respective first comparator output pin 82, 2082, 3082, 4082, 5082, 6082; the respective second comparator positive input pin 56, 2056, 3056, 4056, 5056, 6056 is connected to the 10v reference voltage and the respective second comparator negative input pin 54, 2054, 3054, 4054, 5054, 6054 is connected to the less than five volts present at the respective signal voltage trace establishing a forward bias in the respective second comparator and the respective second comparator outputs a high state voltage at the respective second comparator output pin 84, 2084, 3084, 4084, 5084, 6084; the respective third comparator positive input pin 62, 2062, 3062, 4062, 5062, 6062 is connected to the less than five volts present at the respective signal voltage reference trace and the respective third comparator negative input pin 60, 2060, 3060, 4060, 5060, 6060 is connected to the 10v reference voltage establishing a reverse bias in the respective third comparator and the respective third comparator outputs a low state voltage at the respective third comparator output pin 104, 2104, 3104, 4104, 5104, 6104; the respective fourth comparator positive input pin 68, 2068, 3068, 4068, 5068, 6068 is connected to the 5v reference voltage and the respective fourth comparator negative input pin 66, 2066, 3066, 4066, 5066, 6066 is connected to the less than five volts present at the respective signal voltage trace establishing a forward bias in the respective fourth comparator and the respective fourth comparator outputs a high state voltage at the respective fourth comparator output pin 124, 2124, 3124, 4124, 5124, 6124; the respective green LED inverting driver input pin 86, 2086, 3086, 4086, 5086, 6086 receives a low state voltage from the respective first comparator output pin 82, 2082, 3082, 4082, 5082, 6082 and a high state voltage from the respective second comparator output pin 84, 2084, 3084, 4084, 5084, 6084; the low state voltage from the respective first comparator output pin pulls the high state output of the respective second comparator pin to a low state and the respective green LED inverting driver outputs a high state voltage at the green LED inverting driver output pin 92, 2092, 3092, 4092, 5092, 6092 not allowing current to flow through the respective green LED 74, 2074, 3074, 4074, 5074, 6074 and not illuminating the respective green LED; the respective yellow LED inverting driver input pin 106, 2106, 3106, 4106, 5106, 6106 receives a low state voltage from the respective third comparator output pin 104, 2104, 3104, 4104, 5104, 6104 and the respective yellow LED inverting driver 100, 2100, 3100, 4100, 5100, 6100 outputs a high state voltage at the respective yellow LED inverting driver output pin 112, 2112, 3112, 4112, 5112, 6112 not allowing current to flow through the respective yellow LED 96, 2096, 3096, 4096, 5096, 6096 (the respective yellow LED does not illuminate); the respective red LED inverting driver input pin 126, 2126, 3126, 4126, 5126, 6126 receives a high state voltage from the respective fourth comparator output pin 124, 2124, 3124, 4124, 5124, 6124 and the respective red LED inverting driver 120, 2120, 3120, 4120, 5120, 6120 outputs a low state voltage at the respective red LED inverting driver output pin 132, 2132, 3132, 4132, 5132, 6132 allowing current to flow through the respective red LED 116, 2116, 3116, 4116, 5116, 6116 illuminating the respective red LED; the respective buzzer inverting driver input pin 138, 2138, 3138, 4138, 5138, 6138 receives a high state voltage from the respective fourth comparator output pin 124, 2124, 3124, 4124, 5124, 6124 and the respective buzzer inverting driver 134, 2134, 3134, 4134, 5134, 6134 outputs a low state voltage at the respective buzzer inverting driver output pin 140, 2140, 3140, 4140, 5140, 6140 (each buzzer inverting driver output pin is connected to the buzzer through the cumulating aural buzzer contact V1) allowing current to flow through the buzzer 136 (the buzzer buzzes); the respective water valve inverting driver input pin 150, 2150, 3150, 4150, 5150, 6150 receives a high state voltage from the respective fourth comparator output pin 124, 2124, 3124, 4124, 5124, 6124 and the respective water valve inverting driver 146, 2146, 3146, 4146, 5146, 6146 outputs a low state voltage at the respective water valve inverting driver output pin 152, 2152, 3152, 4152, 5152, 6152; the NPN transistor base 154 receives the low state voltage from the respective water valve inverting driver output pin through the cumulating water valve circuit contact V2, and the NPN transistor 162 does not allow current to flow through the water valve 184 and the water valve closes.

Figure 9:
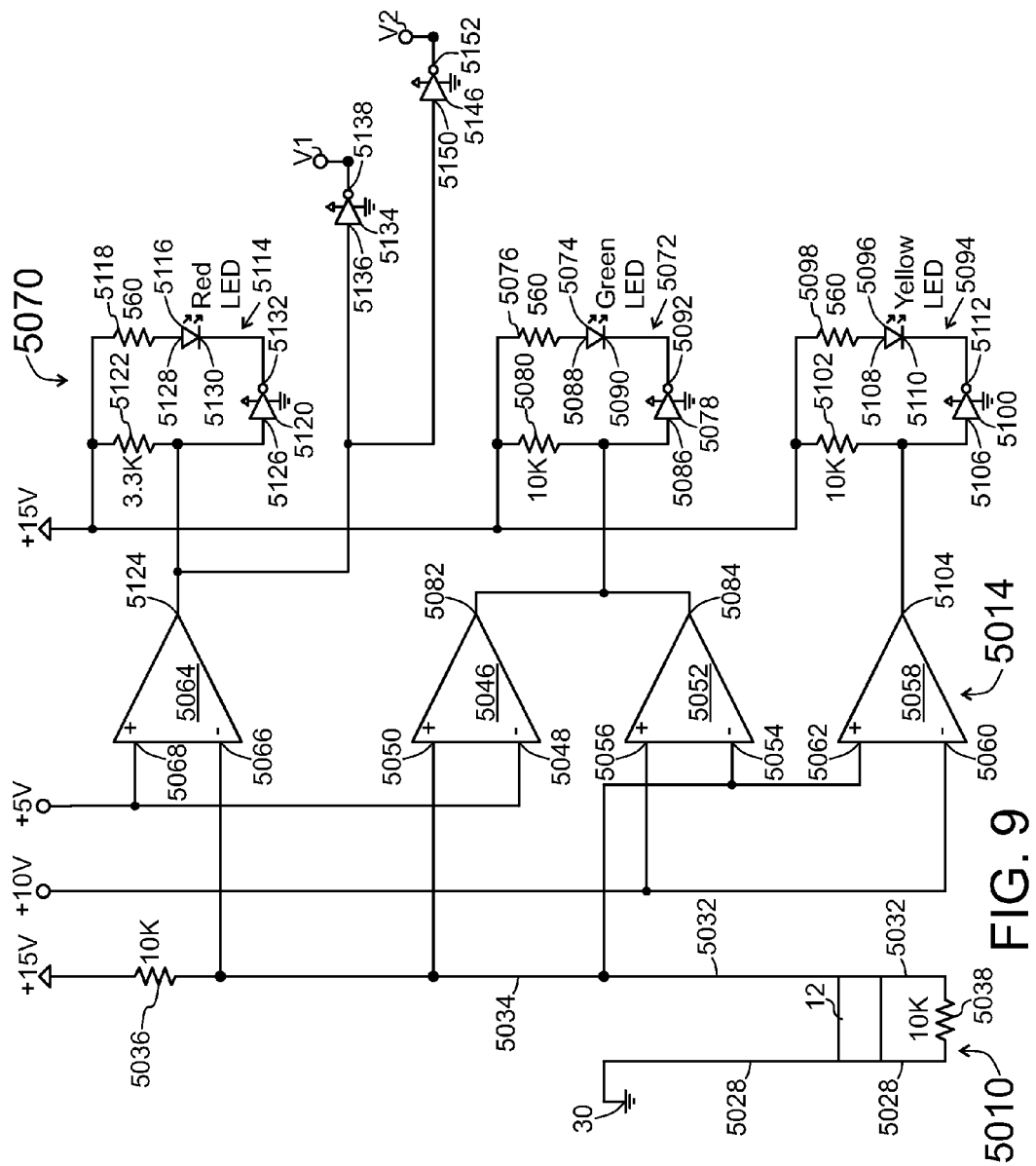
FIG. 9 is a schematic circuit diagram of a fifth sensor set 5010 operatively connected to a fifth comparator set 5014, the fifth comparator set having a first comparator 5046, a second comparator 5052, a third comparator 5058, and a fourth comparator 5064 and the fifth comparator set operatively connected to a fifth LED set 5070, the fifth LED set having a green LED circuit 5072, a yellow LED circuit 5094, and a red LED circuit 5114; and showing the cumulating aural buzzer contact V1 and the cumulating water valve contact V2.

A sensor set may have one leak detector as shown in FIGS. 5, 9, and 10 or two or more leak detectors as shown in FIGS. 1, 6, 7, and 8.

Preferably, the apparatus will have six sensor sets, but the apparatus may have fewer or more sensor sets. In the apparatus, each sensor set has one or more leak detectors and a terminating resistor; each respective sensor set is connected between a ground trace and a respective signal voltage trace of a central controller; the central controller receives a source voltage from a power supply; the central controller has a high reference voltage and a low reference voltage; the central controller has a respective comparator set associated with each respective sensor set and has a respective LED set having three LED circuits associated with each respective comparator set; each respective comparator set has a first comparator, a second comparator, a third comparator, and a fourth comparator; each respective fourth comparator has a respective fourth comparator output pin associated with each respective sensor set; each respective fourth comparator output pin is connected to an aural buzzer through a cumulating aural buzzer contact and connected to a water valve control circuit though a cumulating water valve contact; and the water valve control circuit controls a water valve.

After a leak detector 12 detects a leak or moisture by becoming wet, the leak detector can be reconditioned by a simple process of drying the leak detector after first wetting the leak detector with a sodium chloride solution or other suitable salt solution to ensure the presence of the salt in the insulating layer 22 when the detector is dry.

Preferably, the first wires, the second wires, and the other wires that connect the power supply and the water valve to the central controller are low voltage copper wire.

In the best embodiment of the apparatus, the power supply is a conventional power adapter connected to a standard 115v source to provide power to a 15v rail of the central controller that supplies power to the central controller, to the sensor sets, to the aural buzzer, and to the water valve. The apparatus could also function properly with a power source of a reasonable voltage other than 15 volts.

In the best embodiment of the apparatus, each inverting driver is one channel of one of a sufficient number of Toshiba TD62084AP eight channel darlington sink drivers.

In the best embodiment of the apparatus, each comparator is one channel of a National Semiconductor LM339AN quad comparator.

In the best embodiment of the apparatus, the transistor in the water valve control circuit is a Panasonic 2SD1275A darlington pair.

In the best embodiment of the apparatus, the current driver in the water valve control circuit is a Fairchild LM7805A positive voltage regulator.

In the best embodiment of the apparatus, the water valve 184 is an off the shelf spring actuated normally closed valve that is open when power is supplied to the valve by the water valve control circuit.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

I claim:

1. A water leak and humidity detection and control apparatus comprising a first sensor set, said first sensor set having a leak detector, said first sensor set connected to a central controller, said central controller having a first comparator set associated with said first sensor set, said first comparator set also associated with a first LED set, said first comparator set having a cumulating aural buzzer contact, said aural buzzer contact having either a high voltage state or a low voltage state and said aural buzzer contact associated with an aural buzzer and controlling said aural buzzer, said first comparator set having a cumulating water valve contact, said water valve contact having either a high voltage state or a low voltage state and said water valve contact associated with a water valve controlling circuit and said water valve controlling circuit controlling a water valve, a power supply connected to said central controller, said leak detector comprising a respective first conductive metal grid overlaid by a respective porous insulating layer impregnated with a salt and said respective insulating layer overlaid by a respective second conductive metal grid and said respective first conductive metal grid connected to a respective first wire and said first wire at one end connected to a ground trace of said central controller and said respective second conductive metal grid connected to a respective second wire and said second wire connected at one end to a respective signal voltage trace of said central controller, a respective terminating resistor connects the other end of said first wire to the other end of said second wire, said respective signal voltage trace connected in series to a respective signal voltage resistor, and said signal voltage resistor connected in series to a source voltage of said central controller, and said terminating resistor having the same resistance as said signal voltage resistor.

2. A water leak and humidity detection and control apparatus comprising one or more sensor sets, each said sensor set having one or more leak detectors and having a terminating resistor; each said sensor set connected between a ground trace and a respective signal voltage trace of a central controller; said central controller receiving a source voltage from a power supply; said central controller having a high reference voltage and a low reference voltage; said central controller having a respective comparator set associated with each respective sensor set and having a respective LED set having three LED circuits associated with each respective comparator set; each respective comparator set having a first comparator, a second comparator, a third comparator, and a fourth comparator; each respective fourth comparator having a respective fourth comparator output pin associated with each respective sensor set; each respective fourth comparator output pin connected to an aural buzzer through a cumulating aural buzzer contact and connected to a water valve control circuit though a cumulating water valve contact; and said water valve control circuit controlling a water valve.

3. A water leak and humidity detection and control apparatus according to claim 2 wherein each said leak detector comprising a respective first conductive metal grid overlaid by a respective porous insulating layer impregnated with a salt and said respective insulating layer overlaid by a respective second conductive metal grid and said respective first conductive metal grid connected to a respective first wire and said first wire at one end connected to a ground trace of said central controller and said respective second conductive metal grid connected to a respective second wire and said second wire connected at one end to a respective signal voltage trace of said central controller; a respective terminating resistor connects the other end of said first wire to the other end of said second wire; said respective signal voltage trace connected in series to a respective signal voltage resistor; and said signal voltage resistor connected in series to a source voltage of said central controller; and said terminating resistor having the same resistance as said signal voltage resistor.

* * * * *